Patented Oct. 6, 1953

2,654,742

UNITED STATES PATENT OFFICE 2,654,742

GAMMA-MORPHOLINOPROPYL CINNAMATE SALT OF PENICILLIN

Harley W. Rhodehamel, Jr., Indianapolis, Ind., assignor to Eli Lilly and Company, Indianapolis, Ind., a corporation of Indiana No Drawing. Application February 13, 1952, Serial No. 271,432

2 Claims. (Cl. 260—239.1)

This invention relates to a novel penicillin salt and the preparation thereof.

I have discovered that γ-morpholinopropyl cinnamate or its salts can be combined with penicillin or its salts by neutralization or metathetical reactions to form a sparingly soluble penicillin salt, thereby affording a means of precipitating penicillin from solution, and of purifying penicillin. Moreover, the novel penicillin salt can be utilized therapeutically. A prolonged penicillin blood level can be secured upon administering the salt parenterally by methods known to the medical art.

The following examples illustrate the preparation of the novel salt of this invention:

Example 1

To 3 g. of a solution of penicillin (e. g. a commercial mixture of the several penicillins) dissolved in 50 ml. of amyl acetate are added 3 g. of γ-morpholinopropyl cinnamate dissolved in 25 ml. of amyl acetate. The mixture is cooled and stirred occasionally whereupon the γ-morpholinopropyl cinnamate salt of penicillin precipitates. The salt is isolated as by decantation or filtration, and dried in vacuo.

The salt is represented by the following formula in which P represents penicillin:

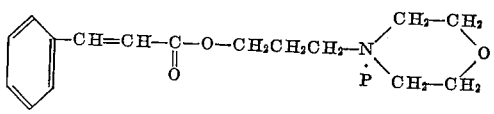

Example 2

To an aqueous solution of 0.3 g. of the potassium salt of penicillin G in 1.8 ml. of water is added a solution of 0.3 g. of γ-morpholinopropyl cinnamate hydrochloride in 5 ml. of water. The mixture is cooled and stirred occasionally whereupon the slightly soluble γ-morpholinopropyl cinnamate salt of penicillin G precipitates. The salt is separated, and dried in vacuo.

γ-Morpholinopropyl cinnamate can be prepared by esterification of cinnamic acid with γ-morpholinopropanol by the usual methods. Acid addition salts of γ-morpholinopropyl cinnamate are readily prepared by the interreaction of equivalent amounts of the base and the desired acid in inert solvent solution, followed by removal of the solvent.

I claim:

1. The γ-morpholinopropyl cinnamate salt of penicillin represented by the following formula in which P represents penicillin:

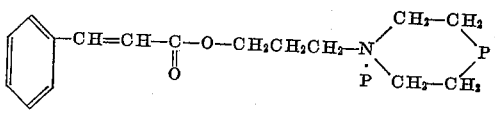

2. The γ-morpholinopropyl cinnamate salt of penicillin G.

HARLEY W. RHODEHAMEL, Jr.

References Cited in the file of this patent

UNITED STATES PATENTS

| Number | Name | Date |
|---|---|---|
| 2,515,898 | Rhodehamel | July 18, 1950 |

FOREIGN PATENTS

| Number | Country | Date |
|---|---|---|
| 659,775 | Great Britain | Oct. 24, 1951 |

OTHER REFERENCES

Ballaro: "Ciencia e Investigacion," vol. 4, November 1948, pp. 481, 482.

Rhodehamel: "J. Am. Chem. Soc.," vol. 73, December 1951, p. 5902.